United States Patent [19]

Blomkvist et al.

[11] Patent Number: 5,824,727
[45] Date of Patent: Oct. 20, 1998

[54] FLOORCOVERING MATERIAL

[75] Inventors: Sten-Åke Blomkvist, Bräkane-Hoby; Jan-Peter Gustavsson, Karlskrona; Anders Konow; Eskil Lundquist, both of Ronneby, all of Sweden

[73] Assignee: Tarkett AG, Frankenthal, Germany

[21] Appl. No.: 866,376

[22] Filed: May 30, 1997

Related U.S. Application Data

[63] Continuation of Ser. No. 629,195, Apr. 8, 1996, abandoned.

[51] Int. Cl.$^6$ ...................................................... C08L 23/00
[52] U.S. Cl. ............................................. 524/52; 524/536
[58] Field of Search ........................................ 524/52, 536

[56] References Cited

U.S. PATENT DOCUMENTS

| | | | |
|---|---|---|---|
| 5,276,082 | 1/1994 | Forry et al. | 524/504 |
| 5,298,549 | 3/1994 | Mecklenburg | 524/445 |

*Primary Examiner*—Peter D. Mulcahy
*Attorney, Agent, or Firm*—Norris, McLaughlin & Marcus

[57] ABSTRACT

A halogen-free flooring material has been discovered which is not based on polyvinyl chloride and which comprises olefin polymers in combination with organic and inorganic fillers. The flooring material generally comprises a polypropylene copolymer and homopolymer, a crosslinked ethylene polymer, organic and inorganic fillers, a flame retardant and an antistatic agent.

17 Claims, No Drawings

FLOORCOVERING MATERIAL

This application is a continuation, of application Ser. No. 08/629,195, filed Apr. 8, 1996 now abandoned.

BACKGROUND OF THE INVENTION

1. Field of the Invention

The invention relates to flooring material, and more specifically concerns a halogen-free flooring material.

2. Description of Related Art

In order to be acceptable, a flooring material has to possess a number of different properties, which are more or less incompatible. One such property is processibility, i.e. it has to be possible to process the material so as to form it into a sheetlike or weblike flooring material. In this context, it is of primary importance that the material is easily calendered. Furthermore, the flooring material should be wear and scratch resistant, and its surface should exhibit such friction as to be suited for use, for instance by people walking on it. In addition, the material should be weldable, enabling the provision of tight joints when putting down a floor. The flooring material should, moreover, enable optimum cleaning, and preferably have a dirt-repellent surface. The resilience and the softness of the flooring material, which are measured by indentation-recovery, are essential qualities, which are of importance in order to avoid lasting indentations of furniture and rolling objects, such as office chairs, and which also affect the walking comfort. Moreover, fire resistance is vital, and the flooring material should be as fire-resistant as possible, while if catching fire, giving off as little irritant smoke as possible.

Using polyvinyl-chloride-based materials, such as polyvinyl chloride (PVC) and vinyl chloride copolymers, primarily copolymers of vinyl chloride and vinyl acetate, as flooring materials is previously known. These materials have many advantages, such as fetching a low price, being easy to process, and having a great range of variation, i.e. the properties of the material are easily adjusted with the aid of various additives, such as plasticisers and pigments.

However, PVC-based flooring materials also suffer from a number of drawbacks. In recent years, attention has focused on these drawbacks, and efforts have been made to provide other synthetic flooring materials not based on PVC. Among other things, PVC-based flooring materials are disadvantageous in that they contain chlorine (halogen), which forms hydrogen chloride upon combustion. Also, the various additives included in PVC-based flooring materials and typically containing different metal compounds yield metal-containing residues when combusted. When PVC-based flooring materials are combusted, various additives, such as limestone or dolomite, are used for binding released chlorine. As a result, larger amounts of material have to be deposited, and the costs are increased.

This invention aims at obviating the drawbacks of the prior art by providing a halogen-free flooring material which is not based on PVC.

SUMMARY OF THE INVENTION

According to the invention, this aim is achieved by a flooring material comprising a defined composition of olefin polymers in combination with certain additives.

To be more specific, the invention provides a flooring material which is characterized in that it comprises:

30–70 parts by weight of a polypropylene copolymer,
10–30 parts by weight of a polypropylene homopolymer,
5–25 parts by weight of a crosslinked ethylene polymer,
10–25 parts by weight of an organic filler,
50–120 parts by weight of an inorganic filler,
0.2–7 parts by weight of a flame retardant,
0.1–4 parts by weight of an antistatic agent.

Preferably, the flooring material according to the invention comprises:

40–60 parts by weight of a polypropylene copolymer,
15–25 parts by weight of a polypropylene homopolymer,
10–20 parts by weight of a crosslinked ethylene polymer,
10–20 parts by weight of an organic filler,
70–100 parts by weight of an inorganic filler,
0.4–4 parts by weight of a flame retardant,
0.4–2 part by weight of an antistatic agent.

These and other distinctive features and advantages of the invention will appear in more detail from the following description as well as the appended claims.

DETAILED DESCRIPTION OF THE INVENTION

As indicated above, the flooring material according to the invention contains a first component in the form of 30–70 parts by weight, preferably 40–60 parts by weight, of an ethylene-propylene copolymer. This component is intended to impart elasticity to the material and to reduce its melting temperature, resulting in a wider temperature range for processing and hence improving the processibility of the material. The copolymer also improves the properties of the flooring material as regards wear resistance and indentation-recovery. In order to attain an aimed-at-processing range of about 200°–220° C., the melting point of the copolymer should be below 170° C., preferably ranging between about 140° C. and 165° C. The density of the copolymer is about 0.89–0.91 g/cm$^3$. The copolymer is available from Himont SRL, P.le Donegani 12, I-44100 Ferrara, Italy under the designation Adflex Q100F.

As a second component, the flooring material according to the invention contains 10–30 parts by weight of polypropylene, preferably 15–25 parts by weight. This component enhances the hardness of the material and reduces its friction. In addition, the dirt-repellent qualities of the material are improved, i.e. the flooring material becomes easier to clean. An example of a preferred propylene polymer is the one available from Borealis AB, S-44486 Stenungsund, Sweden, under the trade name of Embryon® HG 770J having a density of 0.903 g/cm$^3$ and a melt flow of 25 g/10 min (230° C./2.16 kg).

As a third component, the flooring material according to the invention contains 5–25 parts by weight, preferably 10–20 parts by weight, of a crosslinked ethylene polymer, preferably a silane-crosslinked ethylene polymer. The preferred silane crosslinked ethylene polymer may consist of either a graft copolymer of ethylene and an ethylenically unsaturated, hydrolyzable silane compound or, which is preferred, a copolymer of ethylene and an ethylenically unsaturated, hydrolyzable silane compound. As to the silane compound, use may, for instance, be made of vinyl silanes, such as vinyl trimethoxy silane. Such silane (graft) copolymers are crosslinked under the action of water and a silanol condensation catalyst, such as dibutyltin dilaurate. The crosslinked ethylene polymer component improves the processing properties of the mixture by increasing the viscosity of the material and hence reducing the mobility therein, thereby facilitating the achievement of the aimed-atpatterns. Furthermore, the crosslinked ethylene polymer improves the properties of the material as regards wear and indentation-recovery. In order to optimize the effect of the crosslinked ethylene polymer component in the composition, the degree of crosslinking should not be too high. Preferably, the silane compound constitutes about 1–30% by weight, preferably about 1–15% by weight, of the crosslinked ethylene polymer. As an example of a preferred crosslinkable ethylene polymer, mention may be made of the products LE 4421 and LE 4438 available from Borealis AB. The former is the polymer itself, whereas the latter is the crosslinking catalyst.

As a fourth component, the flooring material according to the invention contains 10–25 parts by weight, preferably 10–20 parts by weight, of an organic filler. By the term "organic filler" is meant an organic material which, upon combustion, leaves a residue of no more than 10% by weight, preferably no more than 5% by weight, and which preferably consists chiefly, i.e. to at least 95% by weight, of carbon, hydrogen and oxygen. According to the invention, this organic filler is intended to replace, either by itself or in combination with the other components, the inorganic fillers generally used in prior art flooring materials. In order to be able to perform its function properly, the organic filler should be phase-stable, i.e. form a phase of its own in the form of discrete particles in the flooring material, when the flooring material is being processed. Since the flooring material is normally processed at a temperature below about 200° C., this means that the organic filler should be phase-stable or "particle-stable", i.e. be present in the form of discrete particles in the flooring material, up to a temperature of at least about 200° C. According to the invention, the organic filler preferably is a polymer material selected from one or more of: starch, cellulose and polyethylene, the polyethylene having a melt index below 0.1 g/10 min (190° C./21.6 kg) and a phase stability of at least about 200° C. When used as fillers, starch and cellulose are advantageous in that they both have fairly high contents of hydroxyl groups, which are crosslinked with the silane groups of the crosslinkable ethylene polymer component. This provides yet another possibility of adjusting the properties of the material. As an example of a preferred polyethylene filler, mention may be made of the polymer marketed under the trade name of Lupolen UHM 201 from BASF AG, D-6700 Ludwigshafen, Germany and having a density of 0.93 g/cm$^3$ and a melt flow below 0.1 g/10 min (190° C./21.6 kg). This polyethylene filler also contributes to giving the flooring material a harder surface.

Apart from the components mentioned above, the flooring material according to the invention contains certain additives, as appears from the foregoing and will be described in more detail below.

In order to obtain the aimed-at-flame resistance, the material contains 0.2–7 parts by weight of a flame retardant, preferably 0.6–4 parts by weight. Even though conventional flame retardants are not excluded form the flooring material according to the invention, it is especially preferred that the flame retardant is a silicone replacing conventional antimony or halogen containing flame retardants. The effect of the silicone is enhanced by combining it with an organic metal salt, more specifically an organic salt of a metal from the group IIA of the Periodic Table. Preferably, the organic metal salt is magnesium stearate. The above flame retardant contents include both the silicone and the organic metal salt. Normally, the silicone is present in an amount of 0.1–5 parts by weight, preferably 0.5–3 parts by weight, while the organic metal salt is present in an amount of 0.1–2 parts by weight, preferably 0.1–1 part by weight. In addition to imparting the aimed-at-flame-retardant properties to the material, the flame retardant has a lubricating ability, which facilitates the processing of the material and further enhances its impact resistance. As an instance of a preferred flame retardant, mention may be made of the product available under the trade name of SFR 100 Silicone Fluid from General Electric Silicones, 260 Hudson River Road, Waterford, N.Y. 12188 USA. Further details of this flame retardant are found in U.S. Pat. No. 4,387,176.

Moreover, the flooring material according to the invention contains 0.1–4 parts by weight of an antistatic agent, preferably 0.1–2 parts by weight. This is an additive required in order to avoid static charging of the flooring material and to improve the dirt-repellent properties of the finished material. The antistatic agent employed in the flooring material according to the invention can be selected from known antistatic agents, but preferably with a low degree of migration, for instance in the form of the product available from Dr. Th. Bohme, D-82538 Geretsried, Germany under the trade name of Tebestat PE.

Apart from the components indicated above, the flooring material according to the invention may contain optional conventional additives and pigments.

With the composition described above, the flooring material according to the invention have only marginal contents of metals that are questionable or objectionable form the point of view of the environment and are released by leaching, biological-chemical decomposition or combustion i.e. the content of such metals as aluminum, lead, cadmium, copper, chromium and zinc is basically zero.

The inventive flooring material of the above composition can be produced by using conventional techniques and conventional equipment. There should thus be no need of any detailed description of the production of the flooring material according to the invention. As an example of such production, it may, however, be mentioned that the components and the additives may first be weighed and mixed in cold state, whereupon the resulting mixture is melted and extruded in the form of bands, which are fed to a rolling mill and there are processed to webs. The resulting webs are cut to pieces or crushed and may then immediately be rolled or pressed to form the finished flooring material. Alternatively, the cut or crushed webs may first be stored and then at a suitable moment be heated and rolled or pressed to form the finished flooring material.

The invention will now be further elucidated with the aid of a few non-restricting examples. The following comparison is based on two apparently equivalent, 2-mm-thick homogeneous flooring materials intended for public use. The one flooring material is produced in accordance with the invention, while the other flooring material is a PVC-based flooring material of known composition.

The upper side and the lower side of the flooring material according to the invention and the upper side of the PVC-based flooring material were subjected to a corona treatment in order to increase the adhesion. Then, the upper side and the lower side of the flooring material according to the invention were coated with 5 g (based on dry solids) of a primer (based on RIC from PPG Industries France, Route d'Estreux—BP6 59990 Saultain, France) per m$^2$. Finally, the one surface (the upper side) of the two flooring materials was coated with 10 g per m$^2$ (based on dry solids) of polyurethane (based on NeoRez R-986 from Zeneca Resins, Sluisweg 12 PO Box 123, 5140 AC Waalswijk, The Netherlands). The purpose of this polyurethane layer is to make the flooring materials easier to clean and enhance their dirt-repellent capacity. Since the polyurethane layer affects the wear resistance, the wear-resistance test in Example 1 was also performed on flooring materials having no such surface layer of polyurethane. The other properties of the flooring material are only marginally affected by the polyurethane layer.

The two flooring materials have the following composition.

Flooring Material According to the Invention

| Parts by Weight | Trade Name | Content | Producer |
|---|---|---|---|
| 50 | Ad flex Q100F | Polypropylene copolymer | Himont SRL, P.le Donegani 12, I-44100 Ferrara Italy |
| 20 | Embryon HG77OJ | Polypropylene homopolymer | Borealis AB S-44486 Stenungsund Sweden |
| 14.25 | LE 4421 | Ethylene-vinylsilane-copolymer | Borealis AB S-44486 Stenungsund Sweden |
| 1.25 | LE 4438 | Catalyst | Borealis AB S-44486 Stenungsund Sweden |
| 15 | Lupolen UHM 201 | UHMW-PE | BASF AG, D-6700 Ludwigshafen Germany |
| 90 | Strådolomit A20 | Dolomite | Stråbruken AB Box 4505, S-19104 Sollentuna, Sweden |
| 5 | R600 | Titanium dioxide | Kemira Pigments Oy, FIN-28840 Björneborg, Finland |
| 2 | SFR100 | Flame retardant | General Electric Silicones, 260 Hudson River Road Waterford, NY 12188 USA |
| 0.7 | Pharma | Magnesium-stearate | Bärlocher GmbH Riesstrasse 16 D-80992 Munchen Germany |
| 1.4 | Tebestat PE | Antistatic agent | Dr. Th. Böhme D-82538 Geretsried Germany |
| 1.9 | | Pigment | |

PVC-based Flooring Material

| Parts by Weight | Trade Name | Designation | Supplier |
|---|---|---|---|
| 47.1 | Norvinyl S6260 | PVC | Norsk Hydro Plast AB, S-44483 Stenungsund, Sweden |
| 17.2 | DEHP | Diethylhexyl phthalate | Neste Oxo AB S-44484 Stenungsund, Sweden |
| 0.7 | Lankromark LZ 1694 | BaZn Stabilizer | Akcros Chemicals v.o.f., Molenweg 10 P.O. Box 44, NL-6040 AA Roermond, Holland |
| 0.9 | Lankroflex EWS | Epoxidized soybean oil | Ackros Chemicals v.o.f., Molenweg 10, P.O. Box 44, NL-6040 AA Roermond, Holland |
| 0.3 | Tefacid 1 VT65 | Stearic acid | Karishamns Tefac AB S-37482 Karlshamn Sweden |
| 12.6 | Strådolomit A30 | Dolomite | Stråbruken AB Box 4505, S-19104 Sollentuna, Sweden |
| 10.8 | Sjöhästen FF | Calcium carbonate | Mälmokrita AB Kvarnabyvagen 19, Box 29031, S-20029 Malmö, Sweden |
| 8.4 | Kaolin FA | Kaolin | Zavod 35 - Tezby CZ-33151 Kaznejov Czec. Rep. |
| 2 | | Pigment | |

EXAMPLE 1

In this example, the wear resistance of the flooring material according to the invention was compared with that of the prior art, PVC-based flooring material. The wear resistance was determined according to the Resilient Flooring Weartest in the Draft standard EN 660 by the European Committee for Standardization.

In the test, the wear resistance of the flooring material according to the invention was found to be 2.55 $mm^3$/100 turns for material having a surface layer of polyurethane and 2.0 $mm^3$/100 turns for material having no such surface layer, whereas the PVC-based flooring material had a wear resistance of 3.38 $mm^3$/100 turns when provided with a surface layer of polyurethane and a wear resistance of 3.06 $mm^3$/100 turns when not provided with such a surface layer. Thus, the flooring material according to the invention had a much better wear resistance than the known PVC-based flooring material.

EXAMPLE 2

In this example, the fire propagation and the smoke emission of the flooring material according to the invention and of the prior art PVC-based flooring material were tested. The test was carried out in accordance with: Firetest, Flooring Resistability to spreading fire and smoke development, in the Swedish Standard SIS 024825. According to this standard, the fire propagation should be below 55 cm, and the fire emission should be below 30%.

In the test, the flooring material according to the invention was found to have a fire propagation of 35–50 cm and a smoke emission of 3%, whereas the PVC based flooring material was found to have a fire propagation of 22 cm and a smoke emission of 16%. Both materials thus had a fire propagation well below the standard limit. However, the flooring material according to the invention gave off very little smoke and much less than the PVC-based flooring material.

In addition to this test, the fire propagation and the smoke emission were tested according to the so-called Radiation Panel Test. According to this test, an accepted material should require a power exceeding 0.45 $W/cm^2$ for fire propagation, and the material should exhibit a smoke emission below 750% per min.

In this test, the flooring material according to the invention required 0.78 $W/cm^2$ in order to catch fire and had a smoke emission of 126% per min, whereas the PVC-based flooring material required 0.99 $W/cm^2$ in order to catch fire and had a smoke emission of 300% per min. Also in this case, both materials had fire-propagation values and smoke-emission values below the standard limit. However, the flooring material according to the invention gave off much less smoke than the PVC-based flooring material.

EXAMPLE 3

In this example, the indentation-recovery of the flooring material according to the invention and the PVC-based flooring material were determined in accordance with: Floorings, Determination of indentation, Short time test, Swedish Standard SIS 923505.

In this test, the flooring material according to the invention had an indentation of 0.67 mm after 5 min and a recovery of 76.1% after 24 h. The corresponding values of the PVC-based flooring material were, respectively, 0.74 mm and 87.8%. Thus, the flooring material according to the invention had a slightly lower indentation value and recovery than did the PVC based flooring material.

EXAMPLE 4

In this example, one determined the residues left after combustion of the flooring material according to the invention and the PVC-based flooring material, as well as the deposition requirement created by these combustion residues. The flooring materials were burnt to ashes at 550° C.

The results of the test are indicated in the table below.

| Flooring material | Ashes after combustion | | Deposition requirement for ashes and bound chlorine | |
|---|---|---|---|---|
| | $kg/m^2$ | % by weight of starting material | $kg/m^2$ | % by weight of starting material |
| Invention | 1.24 | 47.8 | 1.24 | 47.8 |
| PVC | 0.84 | 27.6 | 2.4 | 70 |

The much greater deposition requirement of the PVC-based flooring material is, inter alia, due to the addition of lime/dolomite to bind released chlorine.

EXAMPLE 5

This example aims at demonstrating the content of metals, which are environmentally objectionable and originate from fillers and other additives, found in the flooring material according to the invention and the PVC-based flooring material. Thus, the contents of these metals were determined in ashes from the combustion of the flooring materials by dissolving the ashes in concentrated nitric acid. The dissolution was performed by mixing the ashes and the nitric acid in a container of Teflon®, whereupon the container was sealed and heated in a microwave oven. Samples that had not been burnt to ashes were used for determining the contents of cadmium and lead. The final determination of the metal contents was performed with the aid of Plasma emission spectrometry (ICP-AES) or Plasma mass spectrometry (ICP-MS). The metal contents determined appear from the table below.

| | Invention $g/m^2$ | PVC $g/m^2$ | Test Method |
|---|---|---|---|
| Aluminum | 1.04 | 12 | ICP-AES |
| Lead | 0.002 | 0.015 | ICP-MS |
| Cadmium | 0.0000 | 0.0004 | ICP-MS |
| Copper | 0.000 | 0.003 | ICP-AES |
| Chromium | 0.000 | 0.008 | ICP-AES |
| Zinc | 0.02 | 0.55 | ICP-AES |

It is evident from the table that the flooring material according to the invention causes no, or but insignificant, environmental pollution owing to its metal content. It should be pointed out that the PVC-based flooring material has an adverse effect on the environment not only as a result of its metal content but also as a result of the addition of lime/dolomite to bind released chlorine.

What is claimed is:

1. A flooring material, consisting essentially of

30–70 parts by weight of a polypropylene copolymer,

10–30 parts by weight of a polypropylene homopolymer,

5–25 parts by weight of a crosslinked ethylene polymer,

10–25 parts by weight of an organic filler,

50–120 parts by weight of an inorganic filler, 0.2–7 parts by weight of a flame retardant, and 0.1–4 parts by weight of an antistatic agent wherein the organic filler is selected from one or more of starch, cellulose and polyethylene having a melt index below 0.1 g/10 min. (190° C./21.6kg), is phase stable up to a temperature of about 200° C. and is present in the form of discrete particles in the flooring material.

2. The flooring material of claim 1 consisting essentially of:

40–60 parts by weight of a polypropylene copolymer,

15–25 parts by weight of a polypropylene homopolymer,

10–20 parts by weight of a crosslinked ethylene polymer,

10–20 parts by weight of an organic filler,

70–100 parts by weight of an inorganic filler, 0.4–4 parts by weight of a flame retardant, and 0.4–2 part by weight of an antistatic agent.

3. The flooring material of claim 1 wherein the polypropylene is an ethylene-propylene copolymer.

4. The flooring material of claim 3 wherein the crosslinked ethylene polymer is a copolymer of ethylene and an ethylenically unsaturated silane compound.

5. The flooring material of claim 4 wherein the copolymer contains 1–30% by weight of the silane compound.

6. The flooring material of claim 4 wherein the flame retardant consists essentially of a silicone and an organic metal salt.

7. The flooring material of claim 6 wherein the organic metal salt is magnesium stearate.

8. The flooring material of claim 7 wherein the antistatic agent consists essentially of glycerol stearate.

9. The flooring material of claim 2 wherein the polypropylene is an ethylene-propylene copolymer.

10. The flooring material of claim 9 wherein the crosslinked ethylene polymer is a copolymer of ethylene and an ethylenically unsaturated silane compound.

11. The flooring material of claim 10 wherein the copolymer contains 1–30% by weight of the silane compound.

12. The flooring material of claim 11 wherein the flame retardant consists essentially of a silicone and an organic metal salt.

13. The flooring material of claim 12 wherein the organic metal salt is magnesium stearate.

14. The flooring material of claim 13 wherein the antistatic agent consisting essentially of glycerol stearate.

15. The flooring material of claim 2 wherein the crosslinked ethylene polymer is a copolymer of ethylene and an ethylenically unsaturated silane compound.

16. The flooring material of claim 15 wherein the copolymer contains 1–20% by weight of the silane compound.

17. The flooring material of claim 16 wherein the flame retardant consisting essentially of a silicone and an organic metal salt.

* * * * *